United States Patent
Kasahara (10) Patent No.: US 6,367,032 B1
(45) Date of Patent: Apr. 2, 2002

(54) METHOD AND SYSTEM FOR DEBUGGING A MICROPROCESSOR CORE

(75) Inventor: Eiji Kasahara, Sunnyvale, CA (US)

(73) Assignees: Sony Corporation of Japan, Tokyo (JP); Sony Electronics, Inc., Park Ridge, NJ (US)

( * ) Notice: Subject to any disclaimer, the term of this patent is extended or adjusted under 35 U.S.C. 154(b) by 0 days.

(21) Appl. No.: 09/615,659

(22) Filed: Jul. 14, 2000

Related U.S. Application Data (60) Provisional application No. 60/160,856, filed on Oct. 21, 1999.

(51) Int. Cl.[7] .............................................. G60F 11/00
(52) U.S. Cl. .......................................... 714/25; 714/30
(58) Field of Search ............................. 714/25, 27, 30, 714/35, 40

(56) References Cited

U.S. PATENT DOCUMENTS

| | | | | |
|---|---|---|---|---|
| 5,355,369 A | * | 10/1994 | Greenbergerl | 714/727 |
| 5,479,652 A | * | 12/1995 | Dreyer | 714/30 |
| 5,590,354 A | * | 12/1996 | Klapproth | 714/30 |
| 5,867,644 A | * | 2/1999 | Ranson | 714/39 |
| 5,978,902 A | * | 11/1999 | Mann | 712/227 |
| 6,112,298 A | * | 8/2000 | Dean | 712/227 |
| 6,145,122 A | * | 11/2000 | Miller | 717/4 |
| 6,205,560 B1 | * | 3/2001 | Hervin | 714/34 |
| 2001/0010083 A1 | * | 7/2001 | Satoh | 714/30 |

* cited by examiner

*Primary Examiner*—Robert Beausoleil
*Assistant Examiner*—Bryce P. Bonzo
(74) *Attorney, Agent, or Firm*—Wagner, Murabito & Hao LLP (57) ABSTRACT

Method and system for debugging a microprocessor core. In one embodiment, the method comprises the step of receiving as input a test program and test data for testing the microprocessor core. The method also comprises the step of storing multiple instructions of the test program into a first register of a debugging module in the microprocessor core. The method further comprises the step of storing a set of data into a second register of the debugging module, wherein the set of data is a subset of the test data. The method also comprises the step of executing those multiple instructions with the set of data. Importantly, those multiple instructions remain in the first register throughout the testing process such that those instructions need only be stored once for all of the test data, even though the test data is processed in separate sets of data. In one embodiment, the present invention includes the above and wherein the debugging module is based on a version of the IEEE 1149.1 standard. In another embodiment, the present invention includes the above and wherein the debugging module supports a version of the N-wire testing standard and extensions thereto.

26 Claims, 4 Drawing Sheets

METHOD AND SYSTEM FOR DEBUGGING A MICROPROCESSOR CORE

The present application claims priority to the provisional application entitled "64-bit RISC Microprocessor Core with Debug Features" by Eiji Kasahara (Ser. No. 60/160,856, filed on Oct. 21, 1999 pursuant to 35 U.S.C §119(e); 37 C.F.R. §1.78.

BACKGROUND OF THE INVENTION

1. Field of the Invention

The present invention relates to microprocessor technology. More specifically, the present invention pertains to debugging techniques for a microprocessor core.

2. Related Art

Computer systems are extensively used to perform a wide variety of useful operations in modern society. Applications of computer systems can be found in virtually all fields and disciplines, including but not limited to business, industry, scientific research, education and entertainment. For instance, computer systems are used to analyze financial data, to control industrial machinery, to model chemical molecules, to deliver classroom presentations and to generate special effects for movies. Indeed, it has now come to the point where many of these operations have become so computationally intensive that they cannot be efficiently performed without the help of modern computer systems. Strong demand for high performance computing has fueled the rapid development of new and more powerful microprocessors, which are essentially the "brains" of modern computer systems.

Microprocessor design typically involves an extensive testing phase which serves to validate the design and verify the functionality of the chip. In the case of a stand-alone CPU (central processing unit) chip, a logic analyzer can be used to monitor the chip's connection pins with one or more companion chips during testing. As such, the general program flow can be observed and debugging can be performed accordingly. However, in the case of microprocessor coreware, such as S-o-C (System-on-Chip), boundary signals of the CPU core are not sent outside of the chip. In particular, these boundary signals are generally not accessible on the circuit board as an LSI terminal. Thus, the conventional testing technique of waveform observation as utilized for testing stand-alone CPU chips and as described above is not practicable in the case of microprocessor coreware testing.

Given these constraints, it is difficult to divide event points during the testing process, and the designer must instead come up with many different types of test programs in order to thoroughly test the CPU core under investigation. As a result, the testing process is very time-consuming.

To alleviate this problem, engineers use the technique of mounting debugging features to the CPU core so as to facilitate the testing process. Under this approach, porting of an application becomes easier. The testing and tuning of the system is also less tedious.

Nevertheless, existing techniques for mounting debugging features to the CPU core is still not ideal. In particular, the download speed of test programs into the CPU core (e.g., via a serial port) is often a limiting factor to the overall efficiency of the testing process. Hence, it would be advantageous to have a method and system wherein microprocessor coreware can be tested in an efficient manner.

Furthermore, it is appreciated that compatibility is essential in developing an testing or debugging interface. More specifically, numerous vendors will offer different components, applications, and development tools for use in a debugging environment. As such, it would be desirable that these different components, applications, and development tools can communicate via the debugging interface such that they can work together seamlessly.

SUMMARY OF THE INVENTION

It would be advantageous to provide a method and system wherein a microprocessor core can be tested in an efficient manner. It would also be advantageous to provide a mechanism for high speed download of test programs into a microprocessor core that is to be tested. Furthermore, it would be advantageous for such mechanism to utilize an existing standard which has been adopted in the industry in its implementation such that the mechanism is widely compatible with other applications.

Accordingly, the present invention provides a method and system for debugging a microprocessor core wherein test programs can be download into the core via JTAG pins according to the IEEE 1149.1 standard. In addition, the present invention also provides a set of extensions to the specifications of the N-wire functions, which can then be used in conjunction with the JTAG pins for program download. Importantly, based on the N-wire specification extensions, embodiments of the present invention enables multiple monitor instructions to be executed at the same time. As such, the present invention leverages upon a versatile technology platform for on-chip debugging and delivers a system and method that is not only widely compatible with other applications and development tools provided by numerous third party vendors but is also highly reusable in other chip and board designs. Moreover, embodiments of the present invention provide greatly enhanced test program download speed over existing on-chip debugging implementations. These and other advantages of the present invention not specifically mentioned above will become clear within discussions of the present invention presented herein.

More specifically, in one embodiment, the method of the present invention comprises the step of receiving as input a test program and test data for testing the microprocessor core. The method also comprises the step of storing multiple instructions of the test program into a first register of a debugging module in the microprocessor core. The method further comprises the step of storing a set of data into a second register of the debugging module, wherein the set of data is a subset of the test data. The method also comprises the step of executing those multiple instructions with the set of data. Importantly, those multiple instructions remain in the first register throughout the testing process such that those instructions need only be stored once for all of the test data, even though the test data is processed in separate sets of data. In one embodiment, the present invention includes the above and wherein the debugging module is based on a version of the IEEE 1149.1 standard. In another embodiment, the present invention includes the above and wherein the debugging module supports a version of the N-wire testing standard and extensions thereto.

Embodiments of the present invention include the above and wherein the step of storing multiple instructions of the test program into the first register of the debugging module in the microprocessor core as well as the step of storing the set of data into the second register are repeated until the test data has been completely processed. Additionally, embodiments of the present invention include the above and wherein the multiple instructions and the set of data are stored into the first and second registers, respectively, via JTAG pins coupled to the microprocessor core.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION OF THE INVENTION

In the following detailed description of the present invention, a system and method for implementing interactive video based on three-dimensional graphics and broadcast video, numerous specific details are set forth in order to provide a thorough understanding of the present invention. However, it will be recognized by one skilled in the art that the present invention may be practiced without these specific details or with equivalents thereof. In other instances, well known methods, procedures, components, and circuits have not been described in detail as not to unnecessarily obscure aspects of the present invention.

Notation and Nomenclature

Some portions of the detailed descriptions which follow are presented in terms of procedures, steps, logic blocks, processing, and other symbolic representations of operations on data bits within a computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "receiving", "storing", "executing" or the like, refer to the action and processes of a computer system (e.g., FIG. 1), or similar electronic computing device, that manipulates and transforms data represented as physical (electronic) quantities within the computer system's registers and memories into other data similarly represented as physical quantities within the computer system memories or registers or other such information storage, transmission or display devices.

Aspects of the present invention, described below, are discussed in terms of steps executed on a computer system. These steps (e.g., process 300) are implemented as program code stored in computer readable memory units of a computer system and are executed by the processor of the computer system. Although a variety of different computer systems can be used with the present invention, an exemplary general purpose computer system 100 is shown in FIG. 1.

Computer System Environment

Figure 1:
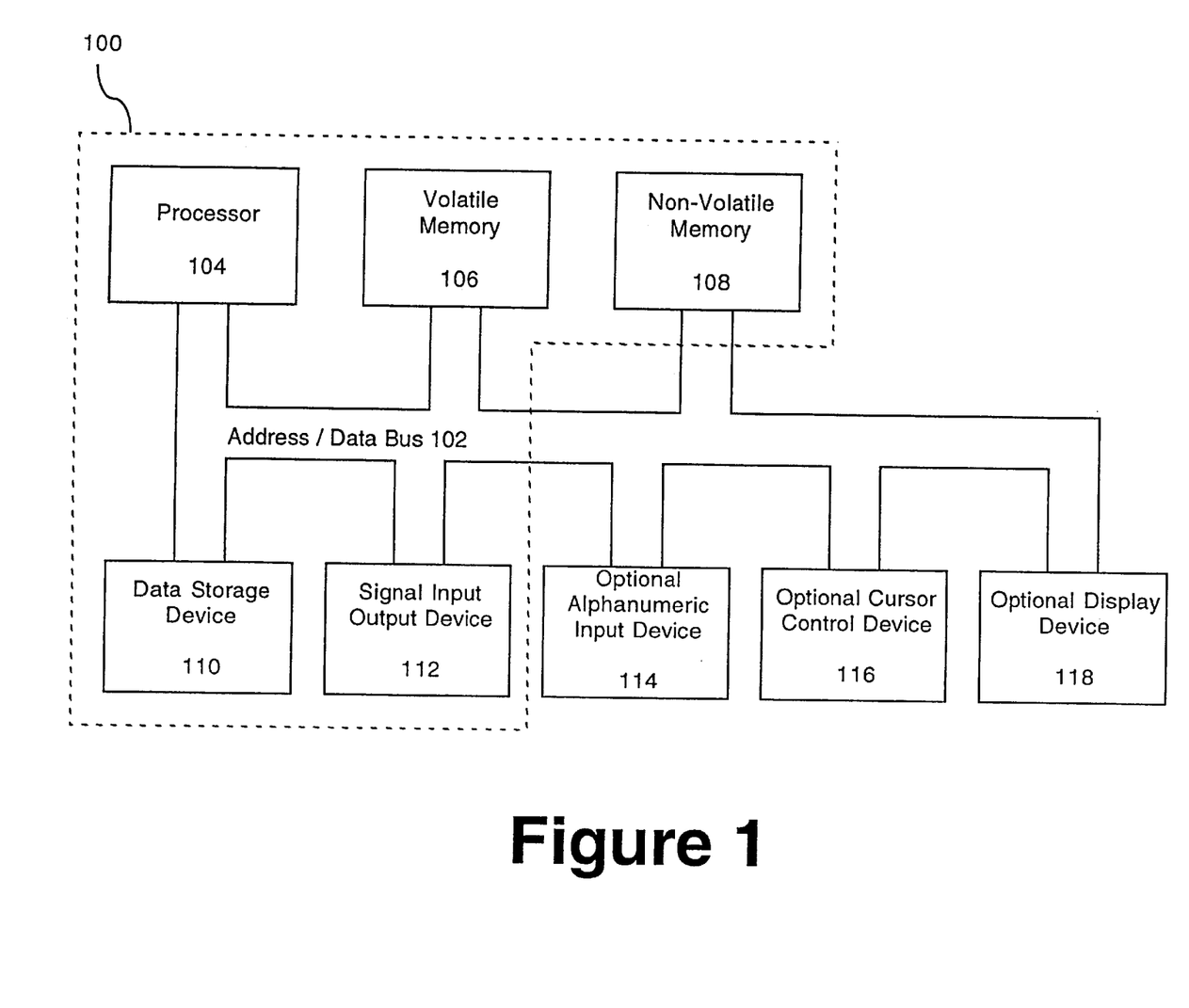
FIG. 1 is an exemplary general purpose computer system having a microprocessor core with which embodiments of the present invention can be implemented.

In general, as illustrated in FIG. 1, computer system 100 includes an address/data bus 102 for communicating information, a central processor 104 coupled to bus 102 for processing information and instructions, a volatile memory 106 (e.g., random access memory RAM) coupled to bus 102 for storing information and instructions for central processor 104 and a non-volatile memory 108 (e.g., read only memory ROM) coupled to bus 102 for storing static information and instructions for processor 104. It is appreciated that computer system 100 of FIG. 1 is exemplary only and that the present invention can operate within a number of different computer systems including general purpose computer systems, embedded computer systems, and stand-alone computer systems. In accordance with the present invention processor 104 is a microprocessor core upon which embodiments of the present invention can be practiced.

Computer system 100 also includes a data storage device 110 ("disk subsystem") such as a magnetic or optical disk and disk drive coupled with bus 102 for storing information and instructions. Data storage device 110 can include one or more removable magnetic or optical storage media (e.g., diskettes, tapes) which are computer readable memories. In accordance with the present invention, data storage device 110 can contain video and graphics data. Memory units of system 100 include 106, 108 and 110. Computer system 100 can also include a signal input output communication device 112 (e.g., modem, network interface card NIC, serial digital input) coupled to bus 102 for interfacing with other computer systems and/or data sources.

Also included in computer system 100 of FIG. 1 is an optional alphanumeric input device 114 including alphanumeric and function keys coupled to bus 102 for communicating information and command selections to central processor 104. Computer system 100 also includes an optional cursor control or directing device 116 coupled to bus 102 for communicating user input information and command selections to central processor 104. An optional display device 118 can also be coupled to bus 102 for displaying information to the computer user. Display device 118 may be a liquid crystal device (LCD), other flat panel display, cathode ray tube (CRT), or other display device suitable for creating graphic images and alphanumeric characters recognizable to the user. Cursor control device 116 allows the computer user to dynamically signal the two dimensional movement of a visible symbol (cursor) on a display screen of display device 118. Many implementations of cursor control device 116 are known in the art including a trackball, mouse, touch pad, joystick or special keys on alphanumeric input device 114 capable of signaling movement of a given direction or manner of displacement. Alternatively, it will be appreciated that a cursor can be directed and/or activated via input from alphanumeric input device 114 using special keys and key sequence commands. The present invention is also well suited to directing a cursor by other means such as, for example, voice commands.

It is appreciated that computer system 100 described herein illustrates an exemplary configuration of an operational platform upon which embodiments of the present invention can be implemented. Nevertheless, other computer systems with differing configurations can also be used in place of computer system 100 within the scope of the present invention.

Figure 2:
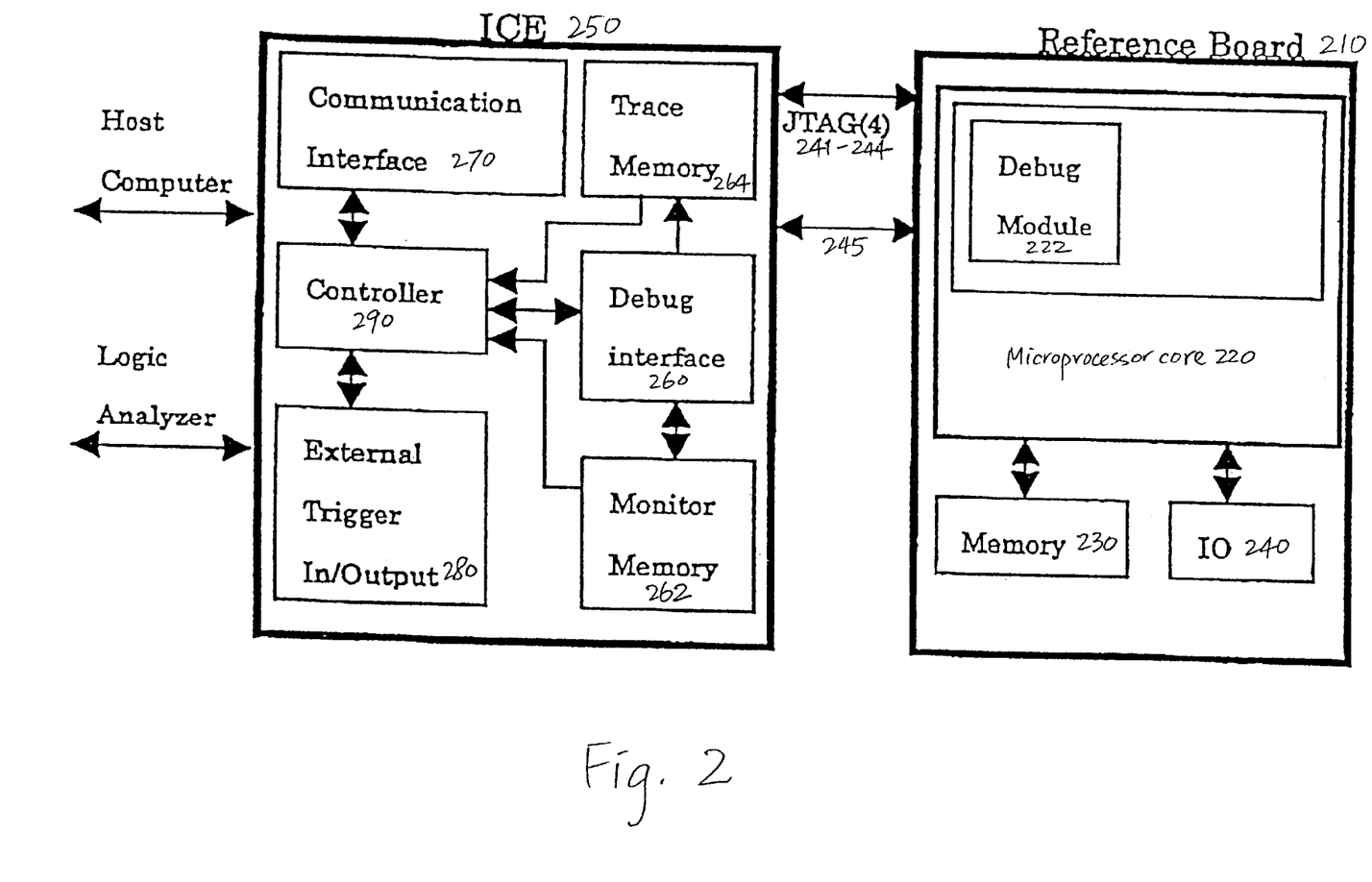
FIG. 2 is a block diagram showing an illustrative debugging environment in accordance with one embodiment of the present invention.

Microprocessor Core Debugging Environment in Accordance with the Present Invention Referring next to FIG. 2, a block diagram depicting an illustrative debugging environment in accordance with one embodiment of the present invention is shown. As illustrated in FIG. 2, within debugging environment 200, a microprocessor core 220 is mounted on a reference board 210. In one embodiment, microprocessor core 220 is a 64-bit RISC microprocessor having a MIPS architecture. In a currently preferred embodiment, microprocessor core 220 is a hard macro core wherein the power supply and clock interconnection are intensified and wherein timing is optimized by the addition of a repeater buffer. As such, in accordance with the present invention, clock skew is minimized and balanced, and static timing analysis of the whole chip is possible.

Also mounted on reference board 210 are a memory module 230 and an I/O module 240. In one embodiment, memory module 230 includes volatile memory 106 (FIG. 1). In another embodiment, memory module 230 includes non-volatile memory 108 (FIG. 1). In yet another embodiment, memory module 230 includes both volatile memory 106 and non-volatile memory 108.

Figure 4:
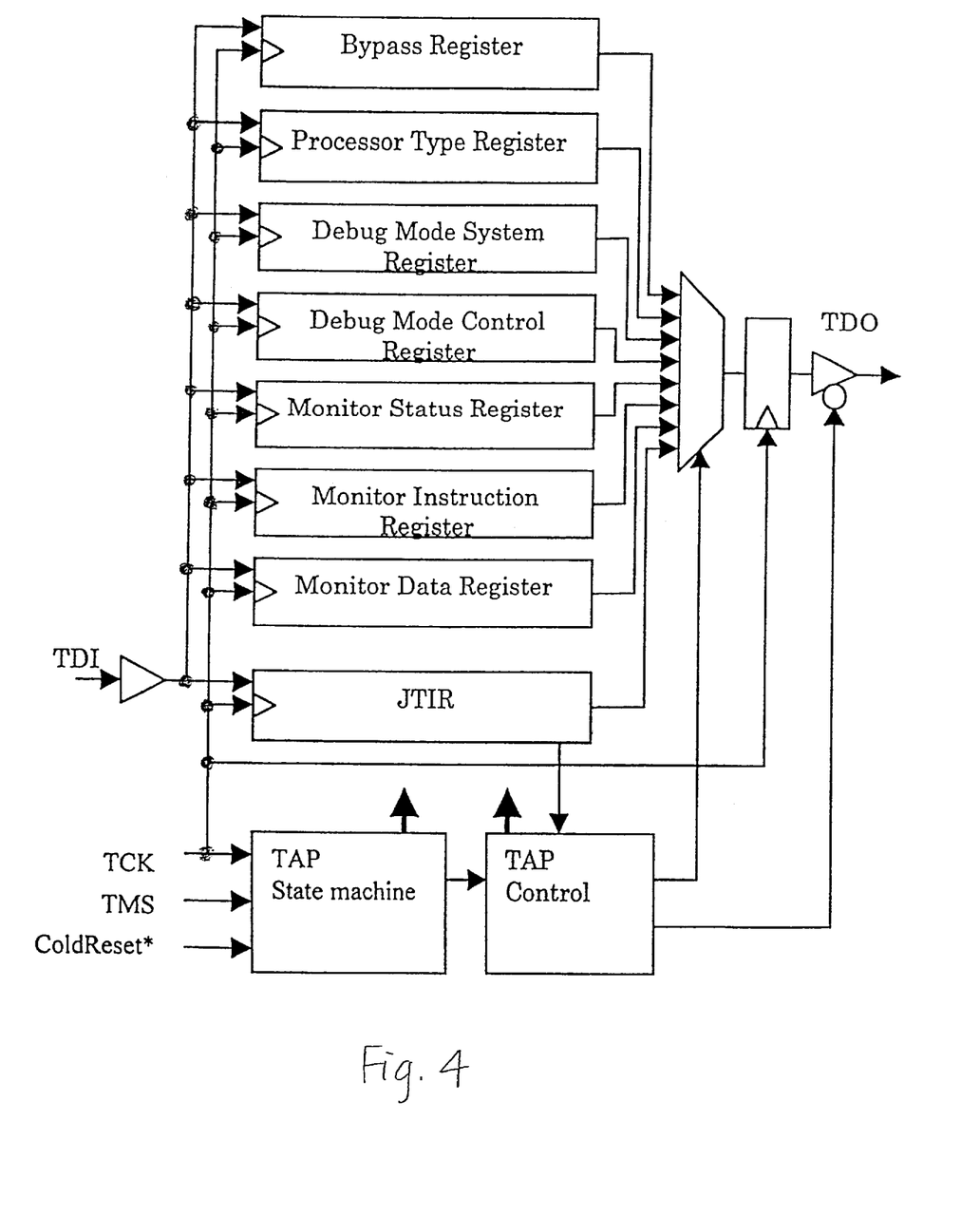
FIG. 4 is a block diagram showing a partial circuitry layout of the debugging module in accordance with one embodiment of the present invention.

Importantly, in accordance with the present invention, microprocessor core 220 comprises a debugging module 222. In a preferred embodiment, debugging module 222 is designed as a module for which logical synthesis is possible. As such, debugging module 222 can advantageously be used as software IP that can be logically synthesized and is reusable in other designs and applications. A block diagram depicting a partial circuitry layout of debugging module 222 in accordance with one embodiment of the present invention is shown in FIG. 4. In accordance with the present invention, debugging module 222 enables microprocessor core 220 to be debugged in a convenient and speedy fashion. The present invention achieves these advantages by enabling the use of JTAG pins to download s-records of a debugging program as well as by implementing various extensions to the N-wire specifications such that the simultaneous execution of multiple monitor instructions is possible. These and other aspects of embodiments of the present invention are described in detail further below.

With reference still to FIG. 2, reference board 210 is coupled to an external in-circuit emulator (ICE) 250. In a currently preferred embodiment, reference board 210 and ICE 250 are coupled via four JTAG pins 241–244 according to the Institute of Electrical and Electronics Engineers (IEEE) 1149.1 standard. The four JTAG pins 241–244 are: Test Clock Input (TCK), Test Mode Select (TMS), Test Data Input (TDI), and Test Data Output (TDO). In this embodiment, reference board 210 and ICE 250 are also coupled via a dedicated pin 245. Within the scope of the present invention, additional JTAG pins, such as Test Reset (TRST), can also be supported. Furthermore, as illustrated in FIG. 2, in a preferred embodiment, ICE 250 includes a controller 290, which is coupled to a debugging interface module 260, a communication interface module 270, an external trigger input output module 280, a monitor memory 262, and a trace memory 264, all of which reside within ICE 250. In addition, debugging interface module 260 is also coupled to monitor memory 262 as well as trace memory 264. In one embodiment, ICE 250 is also coupled to a host computer and a logic analyzer.

In a currently preferred embodiment, the present invention advantageously utilizes a monitor function in conjunction with a specification expansion of N-wire to greatly increase the program download speed from ICE 250 to microprocessor core 220 via JTAG pins 241–244. It is appreciated that the $V_R5464$™ processor designed and manufactured by NEC Electronics, Inc. is one example of a processor that supports a monitor function and an N-wire on-chip debugging port. The $V_R5464$™ processor also provides built-in support for real-time operating systems. It should be appreciated that the use of the NEC $V_R5464$™ processor is merely illustrative. Other processors having similar or more powerful features can also be used within the scope of the present invention.

N-wire Function Extensions in accordance with the Present Invention

In a currently preferred embodiment, the present invention provides a debugging environment that utilizes a standard test architecture, such as the IEEE 1149.1 Joint Test Action Group (JTAG) architecture, which is conducive to be enhanced and extended with other debugging facilities. Accordingly, the present invention further provides a set of N-wire debug functions by way of specification expansion to enable rapid program download from ICE 250 to microprocessor core 220 using the JTAG pins. It is appreciated that N-wire functions refer to a set of on-chip debugging facility first developed by Hewlett Packard Company. The N-wire functions give microprocessor system development tools more direct control over the CPU core. In particular, N-wire functions provide run-time control and access to the processor's internal state. By extending the specifications of the N-wire functions, which can then be used in conjunction with the JTAG pins for program download, the present invention leverages upon a versatile technology platform for on-chip debugging and delivers a system and method that is not only widely compatible with other applications and development tools provided by numerous third party vendors but is also highly reusable in other chip and board designs.

More specifically, in on embodiment, extensions of the N-wire debug functions in accordance with the present invention comprise various debug features. An selected set of the major debug features in accordance with the present invention are described as follow:

1. CPU Break and/or Trigger Functions a) CPU break function based on break points

In general, t his break function involves comparing the program counter (PC), memory access addresses and memory access data values with mask bits, and then shifting the CPU into debug mode if a match is detected. Within the scope of the present invention, various types of break points can be defined, e.g., PC match, store/load address match, data value match, etc.

b) External trigger function by break pointer

This function outputs a trigger to an external ICE (e.g., ICE 250 of FIG. 2) when a break point match is detected.

c) External break

This function force-breaks the CPU by asserting an external pin (e.g., JTAG pin(s)).

d) Software break function

This function enables a CPU break to be initiated programmatically by introducing a software break instruction into the instruction set.

e) Register break function

This function breaks the CPU when a "break bit" of a designated register is set.

f) Step break function

This function causes a debug interrupt each time an instruction is executed when a "step bit" of a designated register is set.

2. Monitor Function

This function is used to download an s-record program. It is supported by a monitor instruction (MON_INST) register, a monitor data (MON_DATA) register, as well as a monitor status (MON_STATUS) register. In one embodiment, the monitor status register includes a MON_INSTEXEC bit (which causes monitor instruction(s) stored in the MON_INST register to be executed when set) and LEN bits (which represents the number of instructions to execute residing in the MON_INST register).

3. Debug Vector Instruction Execution Function

This function is used at a CPU break. Within the scope of the present invention, upon an interrupt of a CPU break, microprocessor core 220 can execute either a debugging program residing in memory (e.g., memory 230) or a debug handler program of the monitor instruction. In one embodiment, dedicated pin 245 allows a debug handler program to be set using a dedicated Test Access Port (TAP). In a currently preferred embodiment, microprocessor core 220 allows a user to switch between a CPU TAP and an ASIC TAP, thereby providing an even higher degree of flexibility to the user during the testing process.

4. Move To/From Debug Register Functions

This pair of functions move data between the debug register (e.g., MON_DATA register) and a general purpose register.

5. Mask Function

This function is used by CPU interrupt pins, such as NMI, INT, RST, and reset pins.

6. Debug Reset Function

This function resets the CPU core and enables debugging to start over from an initial sequence.

7. Debug Return Function (DRET)

This function causes the CPU core to exit debug mode and return to normal mode.

8. Miscellaneous Functions

There are functions available for monitoring various state bits (e.g., CPU status, debug cause, debug exception, SysAD bus activity, etc.), for dynamically switching various control bits, for saving the program counter during debugging.

Moreover, in a preferred embodiment, the present invention enables debugging to be performed without completely stopping the microprocessor core being tested. More particularly, the present invention enables an ICE (e.g., ICE 250 of FIG. 2) to stop and debug one task while allowing debug interrupt routines to continue running. At the same time, a debug monitor program communicates with a debug host via the JTAG pins (e.g., JTAG pins 241–244 of FIG. 2). As such, the microprocessor core can be debugged in a highly efficient manner using this embodiment of the present invention.

Furthermore, in a currently preferred embodiment, a s-record download speed of approximately 1.23 MB per second can be achieved by utilizing the specification expansion of N-wire via the JTAG pins running at a JTAG clock rate of 16 MHz. Thus, as an example, it takes merely 0.81 second to download a 1 MB program using this embodiment of the present invention. This represents an improvement of about 170 times in terms of the download speed when compared to certain prior art implementations.

Figure 3:
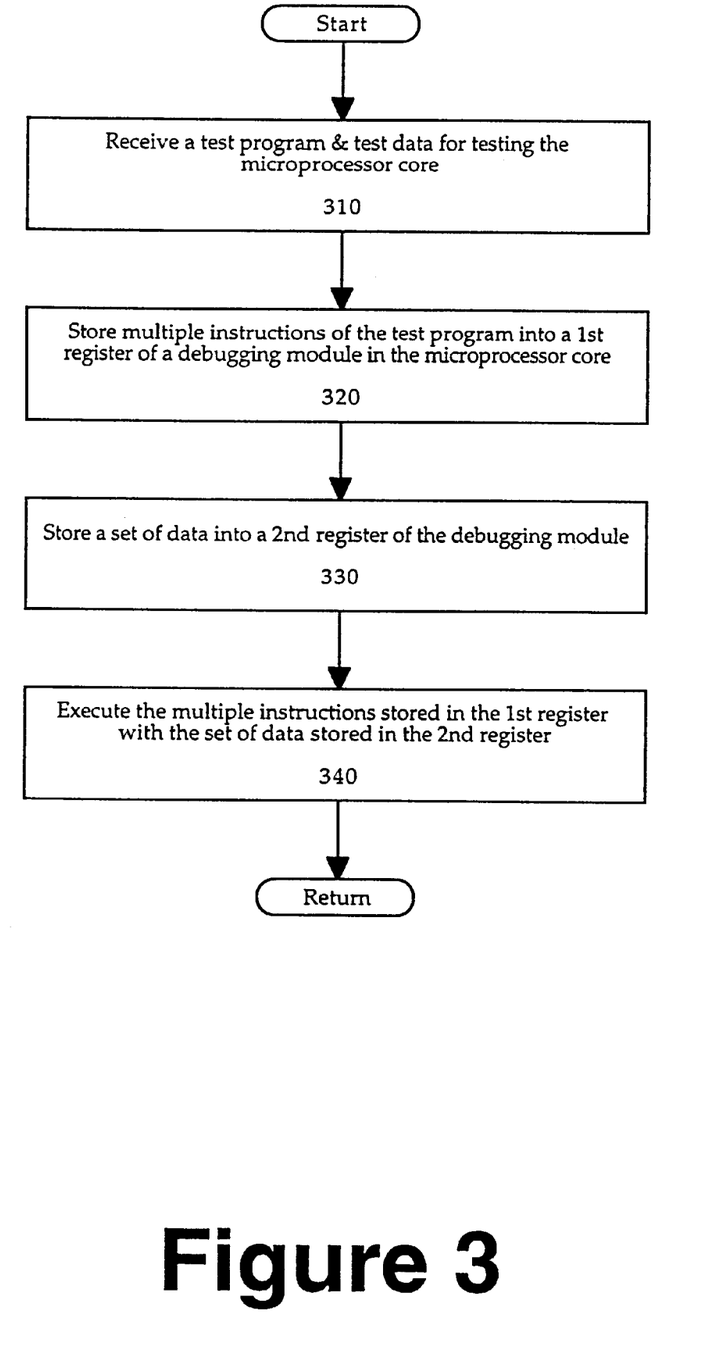
FIG. 3 is a flow diagram illustrating steps for debugging a microprocessor core in accordance with one embodiment of the present invention.

Operation of the Microprocessor Core Debugging System and Method in accordance with the Present Invention Referring next to FIG. 3, a flow diagram illustrating steps for debugging a microprocessor core in accordance with one embodiment of the present invention is shown. In step 310, a test program and test data for testing the microprocessor core is received as input. In one embodiment, the test program and test data comprise multiple s-records within the scope of the present invention. In one embodiment, a CPU break is triggered Referring still to FIG. 3, in step 320, multiple instructions of the test program is stored into a first register of a debugging module in the microprocessor core. In one embodiment, the first register is a monitor instruction register used by the monitor function for storing instructions that are to be executed. In a currently preferred embodiment, the multiple instructions that are stored into the first register include an instruction for moving data from the second register to a general purpose register, an instruction for storing data residing in the general purpose register into a memory, and an instruction for incrementing the address of the memory.

With reference still to FIG. 3, in step 330, a set of data is stored into a second register of the debugging module, wherein the set of data is a subset of the test data as received in step 310. In one embodiment, the second register is a monitor data register used by the monitor function for storing data needed when executing a monitor instruction. In one embodiment, the set of data is eight bytes in size.

Referring again to FIG. 3, in step 340, the multiple instructions are executed with the set of data stored in the second register. Importantly, in a currently preferred embodiment, the multiple instructions remain in the first register such that the storing of those multiple instructions, as described above in step 320, needs only be performed once for all of the test data.

More specifically, in a currently preferred embodiment, steps 330 and 340 as described above are repeated until the entirety of the test data has been completely processed. In this embodiment, during the course of the testing process, the multiple instructions stored into the first register will be executed repeatedly, once for each set of data being loaded into the second register, until all of the test data has been processed. Importantly, although the multiple instructions will be executed numerous times, they only need to be loaded into the first register once. This is because the multiple instructions remain in the first register throughout the duration of the test until all sets of data, which collectively make up the entirety of the test data, are fully processed. This is made possible by the capability of the debugging module to execute multiple monitor instructions at on time. As such, debugging of the microprocessor core can advantageously be performed at a high rate of speed, and the overall design cycle of the coreware is shortened and manufacturing cost is reduced as a result. A method for debugging a microprocessor core in accordance with embodiments of the present invention is thus described.

To further elucidate the operation of the method of the present invention, an illustrative pseudo-code segment based on process 300 of FIG. 3 and which uses the N-wire function extensions described above is provided below:

1. Break into debug mode of the microprocessor core with the debug module enabled (with DINIT bit cleared) using any of the CPU break functions described above
2. Shift three instructions, namely: move-from-debug-register, store-double-word, and add-immediate, into the MON_INST register via the JTAG pins
3. Shift the download data into the MON DATA register via the JTAG pins
4. Set the MON_INSTEXEC bit and the LEN bits in the MON_STATUS register via the JTAG pins
5. Repeat lines 3 and 4 for each 8 bytes of data
6. Shift the DRET instruction into the MON_INST register via the JTAG pins
7. Set the MON_INSTEXEC bit in the MON_STATUS register via the JTAG pins Importantly, as illustrated in the pseudo-code segment above, the three instructions need to be shifted into the MON_INST register only once (line 2). As a result, this embodiment of the present invention is highly efficient because the instructions do not have to be shifted into the MON_INST register each time a 8-byte data set is being processed. Dramatic improvements in performance (e.g., download speed of s-records) is thus achieved by this embodiment of the present invention. It is appreciated that execution of the DRET instruction returns the microprocessor core to normal mode. A specific embodiment of the microprocessor core debugging method of the present invention is thus described.

Although certain embodiments of the present invention as described herein refer to a specific model of microprocessor core, certain specific processor instructions, certain specific registers, or the like, it is appreciated that many other advantageous applications are possible within the scope and spirit of the present invention. For example, the present invention can be advantageously applied to the debugging of any microprocessor core that supports the JTAG and N-wire testing standards as described above. It should be clear to a person of ordinary skill in the art, having read the description of embodiments of the present invention herein, that other applications and embodiments not expressly described herein are also possible without departing from the scope of the present invention.

The preferred embodiment of the present invention, a system and method for debugging a microprocessor core, is thus described. While the present invention has been described in particular embodiments, it should be appreciated that the present invention should not be construed as limited by such embodiments, but rather construed according to the below claims.

What is claimed is:

1. A method for debugging a microprocessor core, said method comprising the steps of:
   a) receiving as input a test program and test data for testing said microprocessor core;
   b) storing multiple instructions of said test program into a first register of a debugging module in said microprocessor core, wherein said debugging module executes said multiple instructions simultaneously, and wherein said multiple instructions remain in said first register throughout processing an entirety said test data;
   c) storing a set of data into a second register of said debugging module, said set of data being a subset of said entirety of said test data, wherein; and
   d) executing said multiple instructions with said set of data, wherein said multiple instructions remain in said first register such that said step b) needs to be performed only once for all of said entirety of said test data.

2. The method as recited in claim 1 wherein said steps c) and d) are repeated until said test data has been completely processed.

3. The method as recited in claim 2 wherein said multiple instructions and said set of data are stored into said first and second registers, respectively, via JTAG pins coupled to said microprocessor core.

4. The method as recited in claim 2 wherein said debugging module is based on a version of the IEEE 1149.1 standard.

5. The method as recited in claim 2 wherein said debugging module supports a version of the N-wire testing standard and extensions thereto.

6. The method as recited in claim 2 wherein said test program is a debug handler program containing monitor instructions, said monitor instructions being instructions supported by said microprocessor core.

7. The method as recited in claim 6 wherein said debug handler program is set using a dedicated Test Access Port (TAP).

8. The method as recited in claim 2 wherein said multiple instructions include an instruction for moving data from said second register to a general purpose register, an instruction for storing data residing in said general purpose register into a memory, and an instruction for incrementing an address of said memory.

9. The method as recited in claim 2 wherein said set of data is eight bytes in size.

10. A computer system comprising a microprocessor core coupled to a bus and a memory unit coupled to said bus, said memory unit having stored therein instructions that when executed implement a method of debugging said microprocessor core, said method comprising the steps of:
    a) receiving as input a test program and test data for testing said microprocessor core;
    b) storing multiple instructions of said test program into a first register of a debugging module in said microprocessor core, wherein said debugging module executes said multiple instructions simultaneously, and wherein said multiple instructions remain in said first register throughout processing an entirety said test data;
    c) storing a set of data into a second register of said debugging module, said set of data being a subset of said entirety of said test data; and
    d) executing said multiple instructions with said set of data, wherein said multiple instructions remain in said first register such that said step b) needs to be performed only once for all of said entirety of said test data.

11. The computer system as recited in claim 10 wherein said steps c) and d) are repeated until said test data has been completely processed.

12. The computer system as recited in claim 11 wherein said multiple instructions and said set of data are stored into said first and second registers, respectively, via JTAG pins coupled to said microprocessor core.

13. The computer system as recited in claim 11 wherein said debugging module is based on a version of the IEEE 1149.1 standard.

14. The computer system as recited in claim 11 wherein said debugging module supports a version of the N-wire testing standard and extensions thereto.

15. The computer system as recited in claim 11 wherein said test program is a debug handler program containing monitor instructions, said monitor instructions being instructions supported by said microprocessor core.

16. The computer system as recited in claim 15 wherein said debug handler program is set using a dedicated Test Access Port (TAP).

17. The computer system as recited in claim 11 wherein said multiple instructions include an instruction for moving data from said second register to a general purpose register, an instruction for storing data residing in said general purpose register into a memory, and an instruction for incrementing an address of said memory.

18. The computer system as recited in claim 11 wherein said set of data is eight bytes in size.

19. A computer system for debugging a microprocessor core, said computer system comprising:

means for receiving as input a test program and test data for testing said microprocessor core;

first storage means in a debugging means in said microprocessor core for storing multiple instructions of said test program, wherein said debugging module executes said multiple instructions simultaneously, and wherein said multiple instructions remain in said first register throughout processing an entirety said test data;

second storage means in said debugging means for storing a set of data, said set of data being a subset of said entirety of said test data; and means for executing said multiple instructions with said set of data, wherein said multiple instructions remain in said first storage means such that said storing of said multiple instructions needs to be performed only once for all of said entirety of said test data.

20. The computer system as recited in claim 19 wherein said multiple instructions and said set of data are stored into said first and second storage means, respectively, via JTAG pins coupled to said microprocessor core.

21. The computer system as recited in claim 19 wherein said debugging means is based on a version of the IEEE 1149.1 standard.

22. The computer system as recited in claim 19 wherein said debugging means supports a version of the N-wire testing standard and extensions thereto.

23. The computer system as recited in claim 19 wherein said test program is a debug handler program containing monitor instructions, said monitor instructions being instructions supported by said microprocessor core.

24. The computer system as recited in claim 23 wherein said debug handler program is set using a dedicated Test Access Port (TAP).

25. The computer system as recited in claim 19 wherein said multiple instructions include an instruction for moving data from said second storage means to a general purpose storage means, an instruction for storing data residing in said general purpose storage means into a memory, and an instruction for incrementing an address of said memory.

26. The computer system as recited in claim 19 wherein said set of data is eight bytes in size.

* * * * *